UNITED STATES PATENT OFFICE.

FRED D. BLAKE, OF CHARLOTTE, NORTH CAROLINA, ASSIGNOR TO BLAKE CAR STEP WORKS, OF CHARLOTTE, NORTH CAROLINA.

CAR-STEP.

1,136,583.    Specification of Letters Patent.    Patented Apr. 20, 1915.

Original application filed February 13, 1914, Serial No. 818,519. Divided and this application filed May 16, 1914. Serial No. 839,059.

*To all whom it may concern:*

Be it known that I, FRED D. BLAKE, a citizen of the United States, residing at Charlotte, in the county of Mecklenburg and State of North Carolina, have invented a new and useful Car-Step, of which the following is a specification.

This invention relates to car steps and is more particularly a division of an application filed by me on February 13, 1914, Serial No. 818,519.

One of the objects of the invention is to provide, in connection with an extension step adapted to be retracted out of operative position, a lamp which will illuminate such step when lowered to active position, the lamp provided for this purpose being automatically cut out of circuit when the extension step is folded back to inactive position.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed, without departing from the spirit of the invention.

In the accompanying drawings the preferred form of the invention has been shown.

Figure 1:
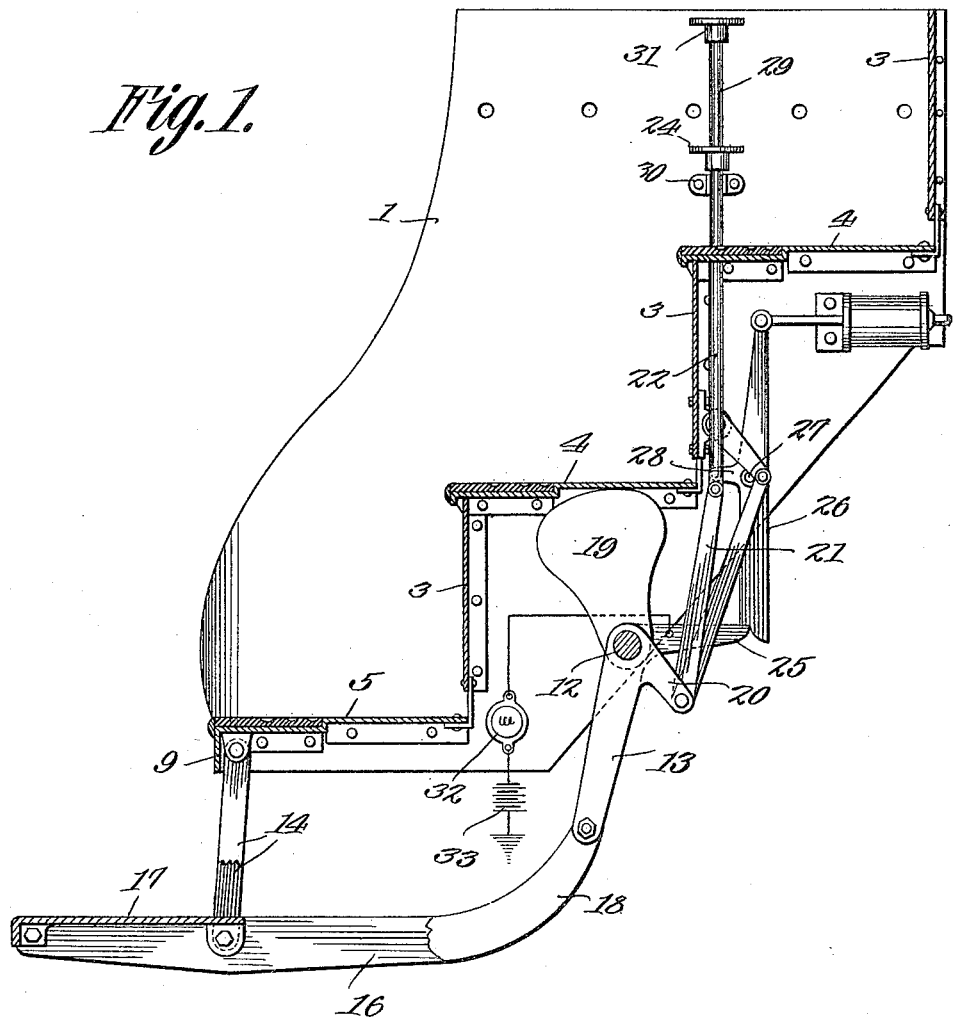
Figure 2:
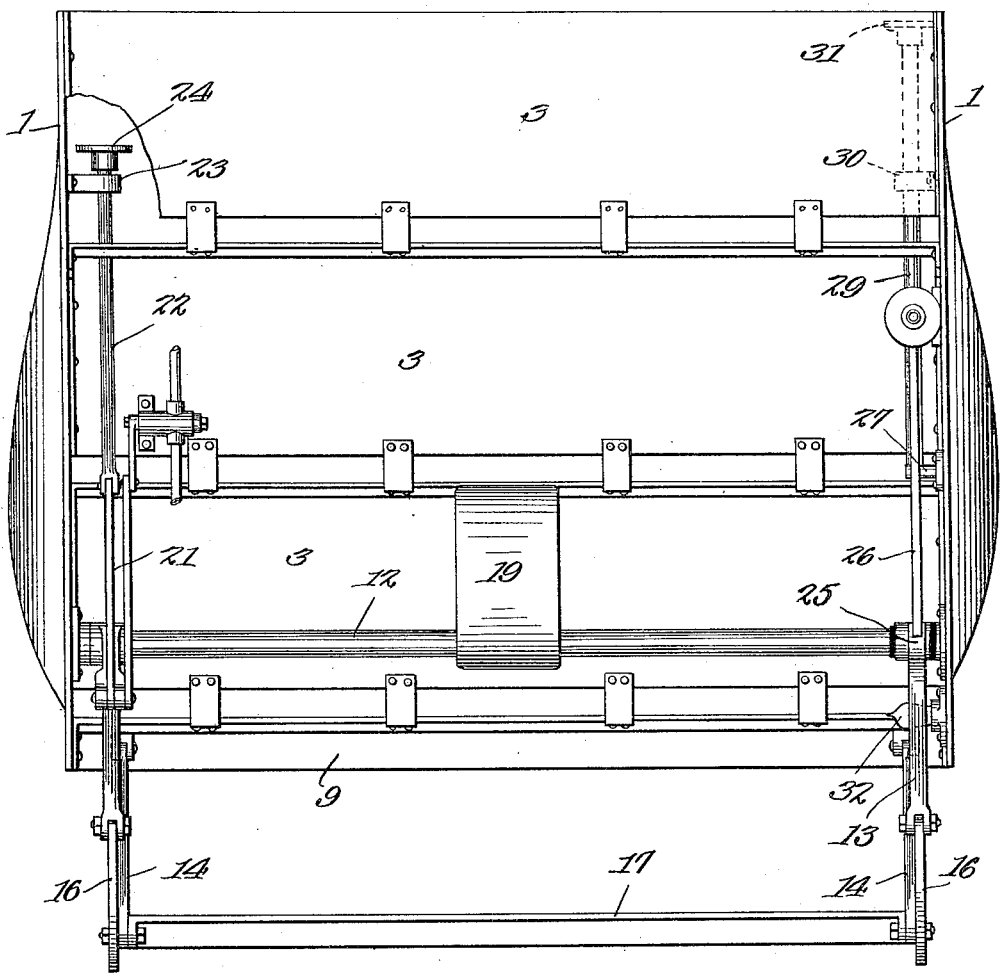

In said drawings: Figure 1 is a vertical longitudinal section through the step and showing the operating mechanism partly in section and partly in elevation, the lamp circuit being shown in diagram. Fig. 2 is a rear elevation of the structure shown in Fig. 1, a portion being broken away.

Referring to the figures by characters of reference 1 designates side plates to which the risers 3 and treads 4 of the fixed steps are connected, these parts all being formed preferably of metal so as to constitute a conductor of electricity.

A shaft 12 is journaled under one of the tread plates and has bell crank levers 13 secured thereto. Links 14 are suspended from the lower tread plate and support side members 16 on which the tread plate 17 of the extension step is secured. These arms 16 are curved inwardly and upwardly as shown at 18 and are pivotally connected to the depending parallel arms of the levers 13. These arms and links are preferably of the same length so that, when shaft 12 is rotated in one direction, levers 13 and links 14 will operate to retract the tread plate 17 to position under and close to the bottom of the lower tread plate 5. A weight 19 is secured to shaft 12 and is adapted normally to hold the tread plate 17 elevated out of active position. One of the levers 13 has its upper arm 20 connected to a link 21. This link is pivotally attached to the lower end of a push rod 22 mounted in a guide bracket 23 secured to one of the side plates 1. The push rod also extends through one of the tread plates 5 at a point close to one of the side plates 1 and a foot plate 24 is preferably arranged upon the upper end of the rod 22. The other lever 13 has its upper arm 25 extended from the shaft 12, this lever being insulated from said shaft. This arm 25 is adapted, when the extension step is lowered to active position, to move downwardly into engagement with the lower end of a latch lever 26 preferably fulcrumed at an intermediate point, as shown at 27 and provided with an arm 28 extending substantially at right angles therefrom. A push rod 29 is pivotally connected at its lower end to the arm 28 and is slidably mounted within one of the tread plates 5 and within a guide bracket 30. A foot plate 31 is preferably provided at the upper end of the push rod 29.

An electric lamp 32 is mounted back of the lower tread plate 5 so that the light therefrom will be thrown onto the tread plate 17 when said plate is moved to extended or active position. This lamp is preferably electrically connected to the arm 25 and is grounded to the car. Thus it will be seen that when the step is extended and the arm 25 is in contact with the latch lever 26, a circuit will be formed from the source of electricity, indicated diagrammatically at 33, through the car structure to latch lever 26, thence to arm 25 and thence to the lamp. When it is desired to shift the extension step to inactive position, the push rod 29 is depressed, thus actuating the latch lever 26 so as to shift it out of engagement with the arm 25. The circuit to the lamp 32 will be promptly broken and, at the same time, the weight 19 will be released and will swing downwardly and forwardly, thus causing shaft 12 to rotate and causing the arms 13 to pull rearwardly and upwardly upon the members 16. Consequently, the tread plate 17 will be elevated to position close to and under the lower tread plate 5 and back of the apron 9. When it is desired to move the extension step to active position, the foot plate 24 is depressed. This will cause the link 21 to push against arm 20 and will rotate shaft 12 so as to elevate the weight 19 to the position shown in Fig. 1 and cause the arms 13 to push against the members 16, thus shifting the extension step downwardly and outwardly to the position shown in Fig. 1. At the same time arm 25 will be brought into engagement with the lower end of the latch lever 26, thus fastening the extension step in its lowered position and at the same time completing a circuit through the lamp 32.

What is claimed is:—

The combination with fixed car steps, of an extension step connected to the lower one of said fixed car steps, means for moving said extension step into and out of active position relative to the lower car step, a lamp located under and protected by the fixed car steps and positioned to cast rays of light onto the extension step when said step is lowered to active position, and means operated by the movement of the extension step into and out of active position for placing the lamp in circuit and out of circuit respectively, with a source of energy.

In testimony that I claim the foregoing as my own, I have hereto affixed my signature in the presence of two witnesses.

FRED D. BLAKE.

Witnesses:
J. L. McCLINTOCK,
J. H. LITTLE.